US005570469A

United States Patent [19]
Soderstrom et al.

[11] Patent Number: 5,570,469
[45] Date of Patent: Oct. 29, 1996

[54] METHOD FOR REMOVING METAL CONTAMINANTS FROM FLUE DUST

[75] Inventors: Dean J. Soderstrom, Henderson; Jesse Gerard, Las Vegas, both of Nev.; Stephen S. Spaulding, Venice, Calif.

[73] Assignee: Lockheed Martin Corporation, Bethesda, Md.

[21] Appl. No.: 369,347

[22] Filed: Jan. 6, 1995

[51] Int. Cl.$^6$ .................................................. G21F 9/00
[52] U.S. Cl. .................................. 588/18; 423/2; 588/736
[58] Field of Search ................................ 423/2; 588/18, 588/236

[56] References Cited

U.S. PATENT DOCUMENTS

| | | | |
|---|---|---|---|
| 3,075,826 | 1/1963 | Gray | 423/2 |
| 3,375,058 | 3/1968 | Petersen et al. | 588/18 |
| 3,882,040 | 5/1975 | Auge et al. | 588/18 |
| 4,255,392 | 3/1981 | Chiang | 423/11 |
| 4,404,105 | 9/1983 | de Lockerente et al. | 588/18 |
| 4,407,781 | 10/1983 | Crossley et al. | 423/15 |
| 4,431,609 | 2/1984 | Scheitlin | 423/2 |
| 4,432,666 | 2/1984 | Frey et al. | 588/257 |
| 4,461,601 | 7/1984 | Pound | 588/249 |
| 4,579,721 | 4/1986 | Friedman | 588/236 |
| 4,601,832 | 7/1986 | Hooykaas | 588/236 |
| 4,657,731 | 4/1987 | Otte et al. | 423/2 |
| 4,741,776 | 5/1988 | Bye et al. | 588/256 |
| 4,790,960 | 12/1988 | Heckmann et al. | 423/2 |
| 5,045,240 | 9/1991 | Skriba et al. | 252/626 |
| 5,128,068 | 7/1992 | Lahoda et al. | 252/626 |
| 5,292,456 | 3/1994 | Francis et al. | 588/18 |

FOREIGN PATENT DOCUMENTS

| | | |
|---|---|---|
| 0491533 | 6/1992 | European Pat. Off. |
| 0550221 | 7/1993 | European Pat. Off. |

OTHER PUBLICATIONS

Soderstrom, D. J., et al., "Cesium and Heavy Metal Removal From Flue Dusts and Other Matrices," Abstract presented at: Federal Environmental Restoration III and Waste Minimization II Conference adn Exhibition, New Orleans, LA, Apr. 27–29, 1994.

Soderstrom, D. J., et al., "Removal of Cesium–137 From Radioactive Contaminated Steel Industry Flue Dust," presented at: 26th National Conference on Radiation Control, Williamsburg, VA, May 22–25, 1994.

Soderstrom, D. J., et al., "Removal of Cesium–137 From Radioactive Contaminated Steel Industry Flue Dust," preprint extended Abstract presented at: The I&EC Special Symposium American Chemical Society, Atlanta, GA, Sep. 19–21, 1994.

Valenti, M., "Cleaning soil without incineration," *Mechanical Engineering*, May issue: 50–55 (1994).

*Primary Examiner*—Edward A. Miller
*Attorney, Agent, or Firm*—Susan T. Evans; Peter J. Dehlinger

[57] ABSTRACT

Flue dust, composed of a fine-particulate acid-soluble matrix containing bound metal contaminants, is treated to remove the metal contaminants. The metal contaminants may include one or more radionuclides, such as cesium-137. The process includes a two-stage leaching procedure to remove contaminant metals from the dust by solubilization and provides a leach residue which is essentially free of radioactivity. Contaminant metals are removed from the leachate solutions by either precipitation or ion exchange. The process is effective in reducing the contaminating metal content in the dust to less than 10% of the originally bound metal.

9 Claims, 3 Drawing Sheets

METHOD FOR REMOVING METAL CONTAMINANTS FROM FLUE DUST

FIELD OF THE INVENTION

The present invention relates to soil remediation, and in particular, to the removal of metal contaminants from flue dust and like solid matrices.

REFERENCES

Ayres, J., et al., U.S. Pat. No. 4,783,253, issued Nov. 8, 1988.

L'Annunziata, "Radiotracers in Agricultural Chemistry."

Teringo, J., *Pollution Engineering*, April 1987.

Trost, B. et al., U.S. Pat. No. 4,783,263.

Valenti, M., *Mechanical Engineering*, 116 (5):51 (1994).

BACKGROUND OF THE INVENTION

Soil contamination by heavy metals, and particularly radionuclides, has occurred widely as a result of mining operations, nuclear power plant operations, nuclear device testing, nuclear detection instrument failure, and the like. The contamination of soils, ores, dusts, and other particulate materials with radioactive materials such as radium, uranium, thorium, and cesium, is an important and widespread environmental problem.

Such a problem exists in the steel industry where the use of Electric Arc Furnace (EAF) treatment is commonplace. The dust generated by Electric Arc Furnaces typically is contaminated with a number of heavy metals, such as iron, zinc, cadmium, and lead, and may contain for example, of 20–90 weight percent ferrite composed of zinc and iron ferrite, and monovalent metals, such as Cs-137, trapped in the ferrite matrix. The flue dust generated by an Electric Arc Furnace typically becomes contaminated with a radionuclide due to the melting of a detection instrument containing a radioactive source material.

Due to increasingly strict regulations governing the composition of materials intended for disposal as non-hazardous solid waste, many of the existing soil remediation technologies are either ineffective at attaining the removal efficiencies required, are uneconomical, or non-versatile (Valenti). Such methods include dust recycling to furnace operations, physical separation methods such as magnetic or electrostatic-based separations, caustic soda leaching, and sulfation roasting followed by water leaching. Physical separation methods may be ineffective in removing certain types of metal contaminants, particularly where the contaminant is bound in a matrix.

It is therefore desirable to provide a method for removing metal contaminants or components from flue dust which is cost effective, significantly reduces the overall volume of hazardous waste for disposal, produces a treatment residue which is essentially free of activity, and is flexible enough to handle flue dusts of varying chemical content.

SUMMARY OF THE INVENTION

The present invention provides a method for removing a selected metal from flue dust composed of a fine-particulate, acid-soluble matrix. Selected metals which may be removed from flue dust by the method of the present invention include iron, cobalt, cesium, zinc, lead, germanium, indium, and cadmium. The selected metal is contained within the matrix in bound form and may include one or more radioactive metals, such as cesium-137 or cobalt-60.

The process includes a two stage leaching procedure to remove contaminant metals from the dust by partial solubilization of the dust matrix, to provide a residue which is essentially free of the selected metals. The metals are then removed from the leaching solutions, typically by precipitation or ion exchange.

In the two-stage leaching process, the flue dust is first slurried in an acidic aqueous leaching medium and treated under conditions effective to leach a portion of the contaminant metals from the matrix. Typically, at least 50% of the selected metal(s) is leached from the dust matrix in the first stage leaching process.

The mixed slurry is separated into a first particulate and a first leachate fraction, and both fractions are then further processed.

In a second stage leaching procedure, the first particulate fraction is contacted with a solubilizing acidic aqueous medium which is effective to partially solubilize the dust matrix to form a second slurry. Treatment of the dust in the second stage acid leaching is effective to partially solubilize, i.e., break down, the dust matrix and reduces the level of metal present in particulate form to less than 10% of the originally-bound metal.

In one embodiment of the invention, both the acidic aqueous leaching medium and the solubilizing acidic aqueous medium contain sulfuric acid as the source of acid.

The resulting composition is separated into a second particulate and a second leachate fraction. The recovered solids (leach residue) are processed for subsequent disposal or release to the environment, following verification of residual metals content. For dusts containing radioactive metals, the leach residue recovered from the second stage leaching is essentially free of radioactivity.

Dissolved metals are then removed from the leachate solutions by either precipitation or ion exchange. In one particular embodiment, the second stage leachate solution is recycled to both the first stage acidic leaching medium and to the second stage solubilizing acidic aqueous medium.

In one general embodiment of the present method, the selective metal for removal from the dust matrix includes a radioactive metal, such as Cs-137, where the matrix may also contain zinc and/or iron. The radioactive metal may be either monovalent or multivalent. In this embodiment, treatment of the second slurry includes adding a non-radioactive isotope of the selected metal to the solubilizing acidic medium in an amount sufficient to effectively displace the radioactive metal from the dust matrix.

One such radioactive metal for removal from flue dust by the method of the present invention is cesium-137. In one specific embodiment, a non-radioactive cesium salt such as cesium chloride is added to the solubilizing acidic medium in the second stage leaching process.

In one aspect, the invention provides a method for removing iron, zinc and/or cesium-137 from flue dust. The process includes a two stage leaching procedure to remove iron, zinc, and cesium-137 from the dust by partial solubilization of the dust matrix, to provide a residue which is essentially free of the selected metals, particularly cesium-137.

Iron and zinc are removed from the leachates by selective precipitation. Iron is first recovered from the leachate solutions by raising the pH of the leachate to between about 3 and 5 to effect precipitation of iron. The pH of the iron-free leachate is then adjusted to at least about 8 to promote precipitation of zinc. Cesium-137 is then removed from the resulting iron and zinc-free leachate by ion exchange. In one embodiment of the present aspect of the invention, a natural zeolite ion exchange material is used to remove cesium-137 from the iron and zinc-free leachate.

These and other objects and features of the invention will become more fully apparent when the following detailed description is read in conjunction with the accompanying figures and examples.

BRIEF DESCRIPTION OF THE FIGURES

FIG. 3 also indicates relevant process streams, as utilized to determine solids and water mass balance flow rates for the process, as described and shown in Example 2.

DETAILED DESCRIPTION OF THE INVENTION

I. Definitions

Figure 1:
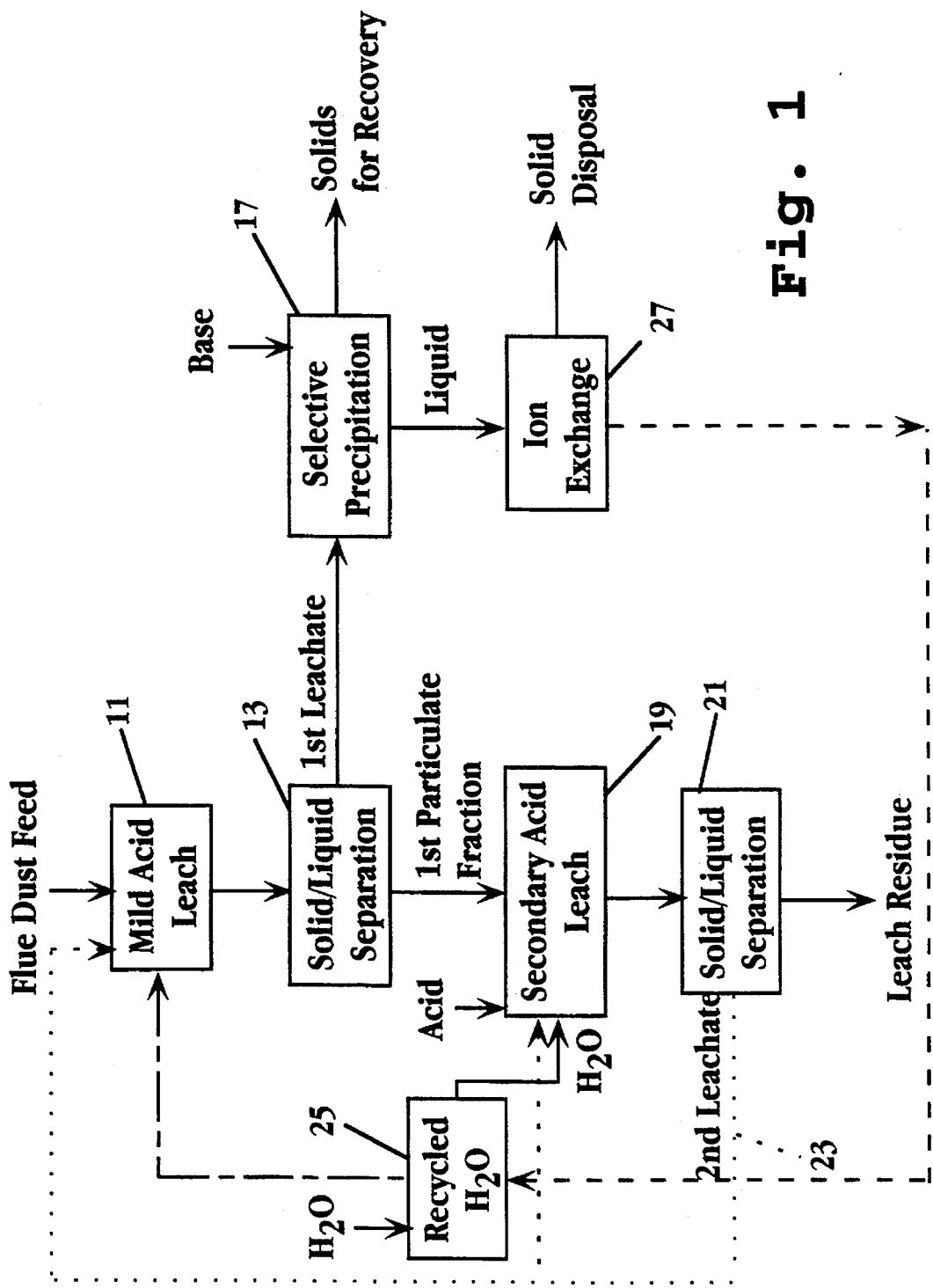
FIG. 1 is a simplified process flow diagram which illustrates methods of metal removal from flue dust in accordance with the present invention.

The following terms, as used herein, have the meanings as indicated:

The term "dust" refers to any finely divided, solid, particulate matter, typically consisting of particles smaller than 200 micrometers in size.

As used herein, "flue dust" refers to dust particles generated in various metallurgical operations, such as melting or smelting, which typically escape from a furnace through the stack.

As used herein, "heavy metal" refers to any metal or alloy having a high specific gravity. In particular, heavy metal refers to any metal having a density greater than 5 grams per cubic centimeter. The heavy metal may also be radioactive.

An "inert" carrier or substance refers to a compound composed of a stable or non-radioactive isotope.

The terms "matrix", "soil matrix" and "flue dust matrix", as stated herein, are used interchangeably, and refer to the ultrafine structure which composes a dust or soil particle, consisting typically of ferrite composed of complex zinc and iron oxides, with minor amounts of silica or other non-metal components, and which is produced, for example, by electric arc furnace production of steel.

The term "radionuclide" or "radioactive element" or "radioisotope" refers to a nuclide containing isotopes that decay and emit radiation. The radioisotope may be derived from any of a number of sources, and as used herein, radionuclide may also refer to various salts or compounds thereof.

The term "zeolite" as used herein, refers to a class of three-dimensional crystalline aluminosilicates having an extensive three-dimensional network of oxygen atoms. As used herein, the term zeolite also encompasses the molecular sieves, which are crystalline materials composed of a three-dimensional framework of oxygen atoms containing tetrahedral sites therein. The tetrahedral sites may be occupied by silicon or aluminum, or may be occupied by other cations.

The zeolite may by synthetic or naturally occurring, and may be chemically modified.

II. Processing of contaminated dusts

The process of the present invention is designed for use in removing metals, and particularly heavy metal contaminants, from particulate materials such as soils, dusts, sludges, sediments, and the like. The metal contaminants present in the particulate material may include one or more radionuclides. Metal contaminants which can be treated by the present method include iron, cobalt, cesium, zinc, lead, germanium, indium, and cadmium. Typically, the predominant metal species contained in flue dust are iron and zinc, present in the form of zinc and iron oxide in the ferrite matrix. Radioactive species which may be present in the particulate material and subsequently removed by the treatment methods disclosed herein include cobalt-60, radium-226, uranium-238, thorium-232, and cesium-137. A preferred radionuclide for removal by the present process is cesium-137.

The general method described herein is for the decontamination of flue dust composed of a fine-particulate, metal-containing matrix. It will be understood that other contaminated particulate matter, such as matter containing radioactive metal fragments, fused or surface contaminated fragments, and/or contaminated soil, can be treated by the same method, with appropriate modifications for handling different-size particles of varying chemical compositions.

The overall processing scheme of the method is shown in FIG. 1. Prior to feeding into the process circuit, the contaminated flue dust may be optionally pretreated by any of a number of commonly-employed techniques. Such pretreatment techniques include high-speed water washing (Ayres) or contacting an aqueous slurry of the contaminated dust with a surfactant or desorbent, such as alphaolefin sulfonate, to desorb surface-bound heavy metals (L'Annunziata, Trost). Other pretreatment techniques include physical methods such as particle size separation (commonly by use of a sieving apparatus), gravimetric separation, magnetic separation, and the like.

For dusts containing radioactive contaminants, the radioactivity of the dust may be verified at various processing stages. Typically, radioactivity will be determined by the use of a radioactive scanner, such as a sodium iodide gamma ray detector. The gamma ray scanning device is adjusted appropriately to monitor the energy decay lines of the radionuclide of interest. For instance, for dusts containing radium-226, the detector is adjusted to read the 0.08 millielectron volt (MeV) and 0.186 MeV emission lines. Similarly, the detector is adjusted to the energies indicated for the following radionuclides: uranium-238 (0.094 MeV), thorium-232 (0.909 MeV, 0.927 MeV), and cesium-137 (0.662 MeV). For samples containing non-radioactive, hazardous heavy metal contaminants, chemical sampling techniques may be utilized.

A. Two-Stage Acid Leaching

Returning now to FIG. 1, flue dust is fed into the primary leach circuit, typically by means of a feed hopper. Herein, the terms primary leach circuit, primary leaching step, first acid leach, and mild acid leach are all used interchangeably. The primary leach circuit, as seen at 11, consists of a series of contactor devices suitable for contacting solid particulates with a liquid medium. Exemplary devices include hydropulpers or agitation tanks, such as attrition scrubbers. Recycled water (indicated by a dashed line) is slurried with the dust feed, along with a portion of the acidic leach solution (indicated by a dotted line) which is generated in the separation step 21 following the second leach circuit 19.

Although under normal conditions the acid for the primary leach circuit is typically supplied from the solution originating in the secondary leach circuit, fresh acid may also be used, e.g., under startup or upset conditions.

Typically, retention time in the circuit ranges from about 30 minutes to 3 hours. The leaching temperatures typically range from about 50° C. to about 80° C. with the lower temperatures corresponding with longer retention times. Preferred reaction conditions include a residence time in the primary leaching circuit of around about 60 minutes, at a leaching solution temperature of around about 70° C. The retention times will vary depending upon the extent of contamination of the dust and the nature of the acidic leaching solution.

The acidity in the first acid leach step is typically controlled to a pH between about 0.1 and 0.5. This corresponds to a normality range of acid in the first acidic aqueous leaching medium between about 0.4 and 1.0. More preferably, the acid content is adjusted to between about 0.4 and 0.6 normal. The terminal acidity level may be maintained by controlling the ratio of the solution recycle from the secondary leach circuit and the feed rate and chemical content of the fresh flue dust feed.

The acidity of the solution which discharges from the mild acid leach circuit is sufficient to maintain acidity, yet is not high enough to cause excessive reagent consumption in the ensuing process steps. Further, the acidic aqueous medium in the first acid leaching, although effective to leach at least 50% of the bound metals from the dust matrix, is not sufficient to solubilize the dust matrix.

A variety of strong acids may be used in the present process, such as nitric acid, sulfuric acid, hydrochloric acid, phosphoric acid, and the like. Particularly preferred are sulfuric or hydrochloric acid. Although it is preferred, for the sake of simplicity, to utilize the same source of acid in both the first mild acid leach step 11, and the secondary acid leach 19, different acids may also be used.

In some instances, hydrochloric acid may be a favorable reagent choice, since calcium compounds present in the dust form readily soluble species upon treatment with hydrochloric acid. As a result, the weight of material remaining in the resulting residue or particulate fraction is reduced.

Alternatively, sulfuric acid may be a preferred reagent, particularly for treatment of flue dusts contaminated with radioactive cesium. Although treatment of calcium-containing dusts with sulfuric acid results in the formation of calcium sulfate or gypsum, a water-insoluble compound, the applicants have discovered that sulfuric acid is preferred for the effective matrix solubilization and removal of radioactive cesium from contaminated flue dust. In a preferred embodiment of the invention, the primary leaching solution contains sulfuric acid in a concentration range between about 0.2 and 0.5 molar. More preferably, the concentration of sulfuric acid is maintained between about 0.2 and 0.3 molar, which corresponds to about 20–30 grams of concentrated sulfuric acid per liter of slurry.

The primary leaching is effective to leach a major portion of the metal contaminants from the dust matrix, typically in amounts of 50–70 percent or higher, under relatively low acidic conditions. Preferably, the first stage leaching is effective to dissolve around about 90% of the metal contaminants, including any radionuclides which may be present in the dust.

In the treatment of flue dusts containing radioactive contaminants, although the primary leaching is effective to remove at least about 50–70 percent of the radionuclide from the dust, it is generally not effective to reduce the levels of radioactivity to near those mandated by regulatory requirements, to levels at or below 5 picocuries per gram.

Returning to the process outlined in FIG. 1, the resulting slurry from the mild acid leach is separated into liquid and solid fractions, as shown at 13. The solution or first leachate fraction is separated from the solid or first particulate fraction in a standard metallurgical settling device, such as a centrifuge, vacuum filter, lamella thickener, hydrocyclone, or settling cylinder, depending on the volume of the slurry. In some cases, the separation may take place in more than one step.

Depending upon the solids content of the first leachate solution, the solution may optionally be further clarified by one or more polishing filters, followed by advancement to a solution surge tank. The surge tank is sized to allow for upset conditions which may arise in either the preceding or immediately following process steps. The surge tank provides latitude for the operator to make minor adjustments in the flows of various streams. This allows the operation to run continuously during periods of minor upset conditions within the various process blocks. The solids recovered from the filter are returned to the secondary leach circuit 19 for further treatment.

The solids from the solids-liquid separation 13 are forwarded to a secondary leach circuit, as indicated at 19. In the secondary leach circuit, solids are repulped in recycled water, previously generated secondary leachate solution 23, and concentrated acid. For treatment of dusts containing a radioactive metal, a non-radioactive isotope of the same metal is added as a cold chase, in an amount sufficient to reduce the level of bound radioactive metal, and thereby improve the efficiency of contaminant removal.

Typically the non-radioactive or inert metal is added in salt form, soluble in the leaching solution, and in an amount effective to improve the removal efficiency of the overall process, typically at least about 100 fold excess over the amount of radioactive metal present in the matrix. The selection of a suitable non-radioactive carrier is based upon the radionuclides present in the flue dust. For instance, addition of cesium-133 chloride significantly improves the removal efficiencies obtained by utilization of the present process for treatment of dust containing radioactive cesium. Other cesium salts which may be used as inert carriers include cesium bromide, cesium iodide, cesium nitrate, and cesium sulfate.

For dusts contaminated with radioactive cesium, the inert carrier is typically added in amounts ranging from 0.025–5 pounds per ton of feed. Preferably, the cesium chloride is added in amounts from about 10–100 mg per liter of slurry. For dusts contaminated with radionuclides and treated by the present process, only about 5 percent of the amount of the originally-present radionuclide remains in the particulate fraction recovered from the first stage leaching. Generally, this corresponds to levels of about 5–140 picocuries per gram cesium-137 for flue dusts contaminated with the same (Table 3). Although the amounts of non-radioactive carrier added are minor in comparison with the volumes of feed treated, the non-radioactive isotope is added in a significant excess over the amount of radionuclide remaining in the particulate dust fraction.

The acidity of the second leaching circuit is controlled to a much greater degree than in the first, mild acid leaching. Further, the leaching conditions employed (acidity, retention time, temperature) are more stringent than in the first stage leaching, and are intended to partially solubilize the dust matrix and to release all of the remaining metal contaminants or components therefrom.

Typically, the terminal acidity in the second stage leaching is over 10-fold greater than in the primary leaching circuit. As mentioned above, any suitable acid may be used, such as hydrochloric, nitric, phosphoric, or sulfuric acid. Preferably, the acid utilized is the same as that used in the first stage leaching. A preferred acid is sulfuric acid.

In one exemplary embodiment of the present invention, sulfuric acid is utilized in the second stage acid leaching. Generally, the concentration of sulfuric acid in the second stage leaching reaction ranges from about 300–500 grams of concentrated sulfuric acid per liter of slurry, or from about 3–5 molar. The pH in the solubilizing acidic aqueous medium is generally maintained between about (–)0.8–(–)1.0. Control of the terminal acidity is afforded by maintaining the ratio of the solution recycle 23 from the secondary leach circuit and the feed rate and chemical content of the fresh flue dust feed.

The leaching temperature in the second stage leaching reaction is typically maintained between about 70° and 100° C. Residence time in the circuit generally ranges from 2–8 hours; preferred residence times are between 2–4 hours.

As shown in FIG. 1, the front end of the present process (process blocks 11, 13, 19, and 21) consists of a two-stage acid leach in which the acidic aqueous flow runs counter current to the solids flow. Although the present process may be carried out using co-current flow, the preferred counter current flow of the solution conserves acid and minimizes the quantity of other reagents required in the subsequent partitioning steps.

Optionally, a chelating agent may be added to the secondary leaching circuit to aid in destruction of the dust matrix and to bind to residual radioactive contaminants contained therein. Chelates which may be used in this regard are molecules which can bind to a radioactive metal ion to form a complex which is soluble under the process conditions of the present invention. Representative chelating agents which may be used include oxalic acid, ethylene diamine tetraacetic acid, citric acid, and 8-hydroxyquinoline. Such agents are typically added in minor amounts, ranging from 110–150 percent of stoichiometry of the expected metal concentration.

The discharge from the secondary leaching circuit is forwarded to a standard solid-liquid separation device, as indicated by 21 in FIG. 1. Generally, the recovered highly acidic secondary leachate solution 23 is stored temporarily and recycled for use in both the primary and secondary leaching steps. In this manner, dissolved metal contaminants contained in the secondary leachate fraction are recirculated back to the primary leaching circuit and subsequently processed, by either selective precipitation or ion exchange, in the downstream portion of the present process.

Metal-free solids recovered from the secondary leaching, herein referred to as leach residue, are washed in a wash circuit with recycled and fresh water to remove traces of remaining entrained solution. The recovered solids are collected and analyzed for residual metals content prior to disposal.

In the downstream portion of the present process, dissolved multivalent metal ions contained in the leachate solutions are partitioned by selective precipitation 17, followed by removal of dissolved monocationic metal ions in the leachate solutions by ion exchange 27. In this manner, non-hazardous metal components present in the dust are recovered in a relatively pure and concentrated form, and may be marketed, safely disposed, or recycled. Further, hazardous, and optionally radioactive components, are isolated from large volumes of flue dust and concentrated to volumes significantly reduced from the starting feed. The metal waste, e.g., zinc or iron waste, and/or radioactive waste, e.g., Cs-137, thus obtained may then be disposed in an appropriate fashion, and at significant savings over that of the original volume of contaminated feed. At the same time, the recovered metal, e.g., zinc or iron salts or oxides, may be reused.

The conditions employed for selective precipitation and partitioning of metal contaminants from the leaching solutions will vary depending upon the metal components contained in the starting flue dust feed. As mentioned above, the predominant heavy metals for removal from the acidic solution stream are typically iron and zinc. As shown in Table 3, iron and zinc represent a significant portion of the components present in flue dust. Treatment by the process of the present invention renders such flue dust heavy metal components as recoverable, essentially free of activity, and suitable for other uses. Other heavy metals which may be present include cesium, lead, germanium, indium, and cadmium.

Figure 2:
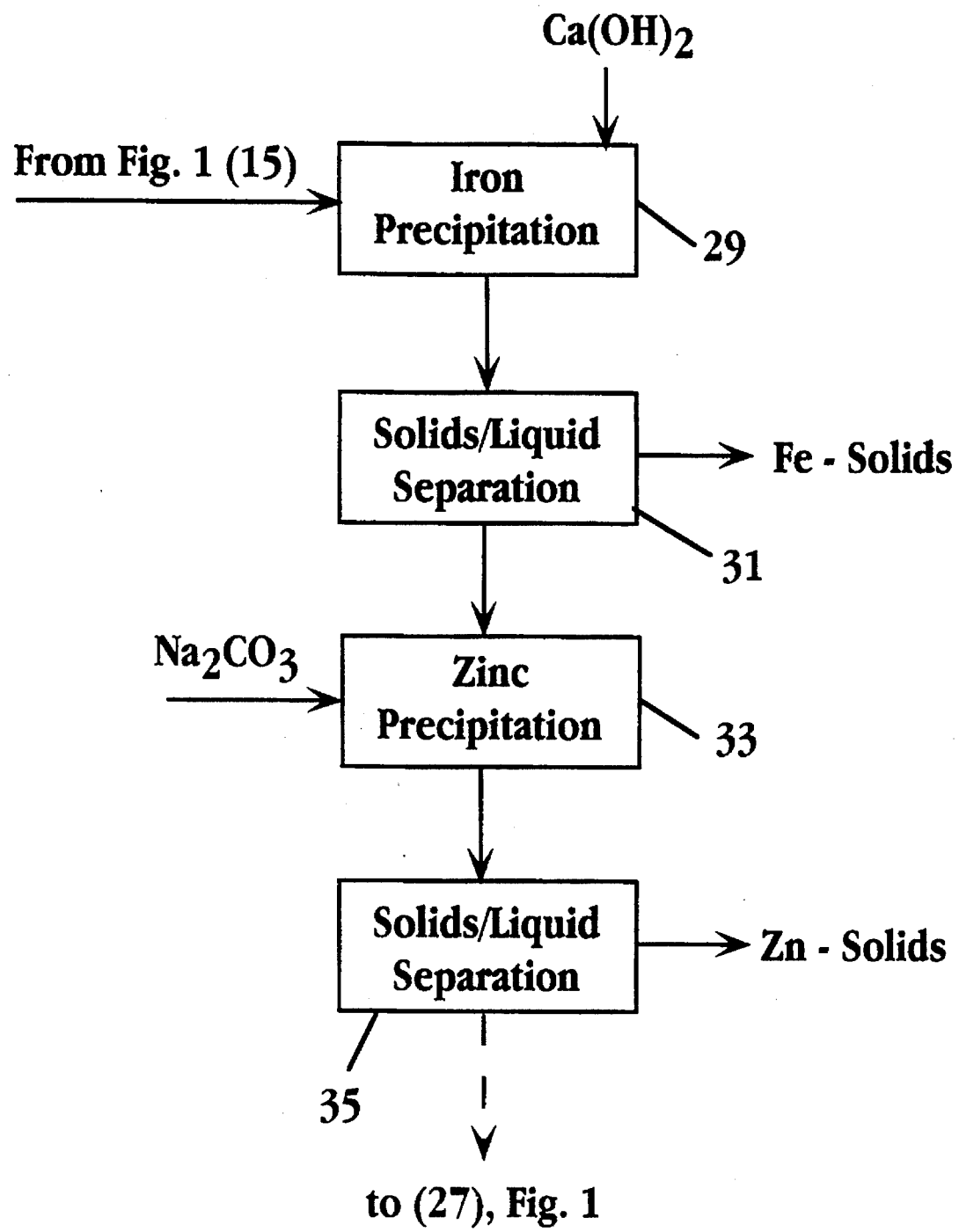
FIG. 2 is a simplified process flow diagram illustrating removal of iron and zinc components from flue dust by selective precipitation, in accordance with one general embodiment of the invention.

In one exemplary embodiment of the invention illustrated in FIG. 2, iron and zinc are recovered from the acidic leaching solutions in a two stage precipitation procedure. Iron present in the ferric valence state is precipitated by the addition of base, as indicated at 29 in FIG. 2.

Addition of base functions to neutralize the excess acidity of the leachate solution and to precipitate the iron as iron hydroxide. The pH of the solution is raised to between about 3.8 and 4.5 by addition of alkali. Any of a number of neutralizing agents may be used in the iron precipitation step, such as caustic (NaOH), lime (CaO), sodium carbonate, magnesium oxide, or soda ash ($Na_2CO_3$) (Teringo). A preferred alkali for use in the present process is lime. The use of hydrated lime offers an additional advantage in that the resulting reaction product is gypsum, which provides a filter aid in the subsequent filtration operation.

The slurry resulting from the iron precipitation step is separated using a series of liquid-solid separation devices, as seen at 31 in FIG. 2. Suitable for this use is any standard metallurgical filter or a filter used in combination with a dewatering device. The final stage of the filtration process should be carried out with a filter which allows for efficient washing of the recovered solids, such as a standard plate and frame filter.

The wash solutions used for washing recovered solids, such as iron and zinc, are preferably advanced in a counter current fashion to minimize the use of water. Additionally, utilization of a counter current wash flow reduces the quantity of solution requiring treatment for removal of radioactive contaminants, such as cesium-137.

The recovered washed iron precipitate is typically devoid of radioactivity and is suitable for any of a number of uses including resale, use as landfill or for recycling purposes. For instance, the recovered iron may be converted to iron sulfate for use as fertilizer. Alternatively, the iron may be converted to ferrite for use in steel mill operations. As described in Example 2 and illustrated in Table 7, the residual radioactive content of the washed iron precipitate is typically quite negligible.

Example 2 describes the processing of EAF contaminated flue dust by the methods of the present invention. Analysis of the washed iron precipitate, recovered by selective precipitation as described above, revealed that the iron solids contained less than 0.5% of the radioactive cesium originally present in the flue dust feed (Table 7). This figure further supports the efficiency of the present process in partitioning the relevant metals contained in flue dust into separate and relatively pure isolated fractions which are considered to be non-hazardous by normal TCLP standards.

The filtrate and recovered wash solutions from the iron precipitation step are then advanced to a zinc precipitation circuit, as shown at 33 in FIG. 2. To effect precipitation of zinc from the iron-free leachate, the pH of the solution is raised to between about 8.0 and 8.5 by addition of base. Preferably, the pH is maintained at around 8.3.

Any suitable base may be used to raise the pH of the slurry, such as caustic (NaOH), lime (CaO), sodium carbonate, magnesium oxide, anhydrous ammonia, or soda ash ($Na_2CO_3$). A preferred alkali for use in the present process is soda ash. Typical residence times in the zinc precipitation circuit may range from 15 minutes to 2 hours, although 30 minutes is generally more than sufficient to promote precipitation of the zinc solids from the reactive slurry.

The recovered zinc solids are then fed to a series of liquid-solid separation devices, as shown at 35, FIG. 2. A device preferably suited for this use is a plate and frame filter fitted with washing capability. Washing the zinc solids ensures that any traces of entrained solution, optionally containing radioactive contaminants, are substantially removed. The zinc solids are then recovered and analyzed for chemical content.

Example 2 describes the processing of EAF contaminated flue dust by the methods of the present invention. Analysis of the washed zinc precipitate, recovered by selective precipitation as described above, revealed that the zinc solids contained less than 0.06% of the radioactive cesium originally present in the flue dust feed (Table 7).

The remaining iron and zinc-free leachate solution is next pumped to a storage surge tank and forwarded to a standard ion exchange operation, 27. In the present process, an ion exchange medium is utilized to adsorb soluble monocationic species from the contaminated leachate solution. Herein, ion exchange is typically used to remove radioactive metal components from the leachate, such as cesium-137.

Adsorbents for use in the present process include standard cation and anion exchangers and selective adsorbents, depending upon the nature of contaminants remaining in the leachate. The amount of solid exchange resin needed can be readily determined by testing the amounts needed to desalt aliquots of the material, and will depend on the amount and types of cation species in the combined leachate solution. Thus, for example, where the resin is used to remove Cs-137, the amount of resin required will depend on the concentrations of other monovalent cations, e.g., Na or K, in the solution, and to a lesser extent on the amount of multivalent cation species in the solution.

Typical ion exchange materials for use in attracting metal cations include strong acid sulfonated, polystyrene divinylbenzene resins, such as AMBERLITE IR-120 (Rohm and Haas, Philadelphia, Pa.); weak acid carboxylic acrylics; strong base quaternary ammonium gels; or weak base polystyrene-polyamine resins. Resins for use in the present invention may optionally be functionalized by incorporation of a chelating group specific for providing an enhanced affinity for the metal of interest.

Preferred adsorbents for use in the present invention include zeolites, such as analcime, chabazite, clinoptilolite, erionite, mordenite, and a variety of like, processed, commercially available zeolites or molecular sieves. Generally speaking, zeolites are three-dimensional crystalline aluminosilicates having an extensive three-dimensional network of oxygen ions. Particularly preferred for use in the present process are naturally occurring zeolites. Such materials may be obtained, for example, from GSA Resources, Inc. (Cortaro, Ariz.), Steelhead Specialty Minerals (Spokane, Wash.), and Zeotech Corp. Amorphous materials such as clay may also be used.

Ion exchange is typically carried out by passage of the leachate solution through a column packed with the preferred ion exchange material. Alternatively, the contaminated leachate and ion exchange material may be mixed together to form a slurry. Such mixing may be a batch process, for instance using a mixed tank, or continuous, using an attrition scrubber flow through mixer.

The effluent from the ion exchange procedure is free from contamination, and particularly free of radioactivity, and suitable for recycle, as illustrated in FIG. 1. Typically, a portion of the ion exchange effluent is drawn off from the system to avoid the buildup of salts.

Table 7 illustrates the efficiency of the present process to partition and effectively isolate radioactive cesium from contaminated flue dust. Upon analysis, over ninety-nine percent of the radioactive cesium contained in the contaminated flue dust feed was recovered in the ion exchange resin.

For feeds containing radioactive contaminants, such as flue dust, treatment by the methods of the present invention provides: (i) both recoverable and non-radioactive containing solids, such as iron and zinc, suitable for future disposal and/or sale; and (ii) greatly reduces the volume of radioactive waste for disposal by isolating and concentrating radioactive contaminants present in dusts by adsorption onto an ion exchange material.

From the foregoing, it will be appreciated how various objects and features of the invention are met. The method of the invention allows reclamation of heavy metals, such as zinc and iron, from flue dust, while substantially reducing the bulk of waste dust material for disposal.

The method is also efficient for decontaminating flue dust having radioactive metal contamination, for example, in achieving the levels of residual contamination in the treated material mandated by the Nuclear Regulatory Commission. Parallel studies performed by the inventors on radioactive flue dust by a variety of water washing methods, and by a variety of treatment methods involving physical separation methods showed that these methods were not able to achieve the low levels of radioactivity required in flue dust processing.

The following examples illustrate, but in no way are intended to limit the scope of the present invention.

Materials and Methods

Flue dust feed from Electric Arc Furnace (EAF) operations, contaminated with cesium-137, was obtained from various industrial sources.

EXAMPLE 1

Characterization of Flue Dust

The overall composition of flue dust treated by the methods of the present invention was determined by various analytical techniques, including MCA (Multi-Channel Analyzer), X-ray fluorescence (XRF), X-ray diffraction (XRD), and scanning electron microscopy (SEM). Scanning electron microscopy was carried out on a Hitachi S-450 scanning electron microscope, operating at an acceleration voltage of 25 kV and fitted with a solid state lithium detector.

A. Size Distribution

The general overall size distribution of flue dust obtained from Electric Arc Furnace (EAF) operations was determined using a conventional sub sieve analyzer. The relative amounts of dust retained versus that which passed through each of the progressively smaller-sized screens are indicated in Table 1.

TABLE 1

TYPICAL PARTICLE SIZE ANALYSIS
EAF FLUE DUST

| Sieve Size (U.S.) | Opening, Microns | % Retained | Accum. % Retained |
|---|---|---|---|
| 60 | 250 | 0 | 0 |
| 100 | 149 | 0.012 | .012 |
| 150 | 105 | 0.090 | 0.102 |
| 200 | 75 | 0.361 | 0.463 |
| 325 | 44 | 1.719 | 2.182 |
| — | 25 | 5.067 | 7.249 |
| — | 10 | 7.397 | 14.646 |
| — | 5 | 5.513 | 20.159 |
| — | minus 5 | 79.84 | — |

As illustrated in Table 1, flue dust is typically composed of very fine particulate matter. As indicated in columns three and four of Table 1, nearly 80% of the flue dust was smaller than 5 µ in size, with about 20% of the particles ranging from 149–5 µ in size.

B. Alkaline Oxide Content

Alkaline oxide content of various samples of EAF flue dust was determined by X-ray fluorescence. The alkaline oxide content of the dust impacts the stoichiometry of the reagents, particularly acid, to be used in the present treatment method. The alkaline oxide content of the flue dust ranged from 20–30% by weight.

X-ray fluorescence analysis indicated the presence of the following minor and major metal-containing phases in the flue dust, as shown in Table 2.

TABLE 2

XRD ANALYSIS

| Compound | Relative Quantity |
|---|---|
| Magnetite ($Fe_3O_4$) | Major |
| Zincite (ZnO) | Subordinate |
| $Ca_2MgFe_2O_6$ | Minor |
| Quartz | Trace |
| Unidentified | Trace |

C. Bulk Density and pH

Bulk density of the flue dust was determined by standard mineral processing methods. The bulk density of the dust varied from 56–174 lbs per cubic foot. The natural pH of the dust was determined by standard mineralogical methods and was typically above about 12.

D. Chemical Content

The present treatment method was carried out on a number of different dust feed samples possessing variable component concentrations, as indicated in Table 3. The relative concentrations of each of the following dust components, cesium-137, zinc, iron, calcium, and lead, were determined by conventional chemical analytical methods. The results in Table 3 illustrate the versatility of the present method and the ability to handle solid feeds having variable compositions.

TABLE 3

EAF FLUE DUST COMPOSITION

| Component | Flue Dust Composition (%) |
|---|---|
| Activity Level (Cs-137) | 100–2800 pCi/gm |
| Zinc Content | 10–30% |
| Iron | 30–36% |
| Calcium | 7–16% |
| Lead | 0.5–2.3% |

EXAMPLE 2

Treatment of EAF Flue Dust by Two-Stage Acid Leaching

Figure 3:
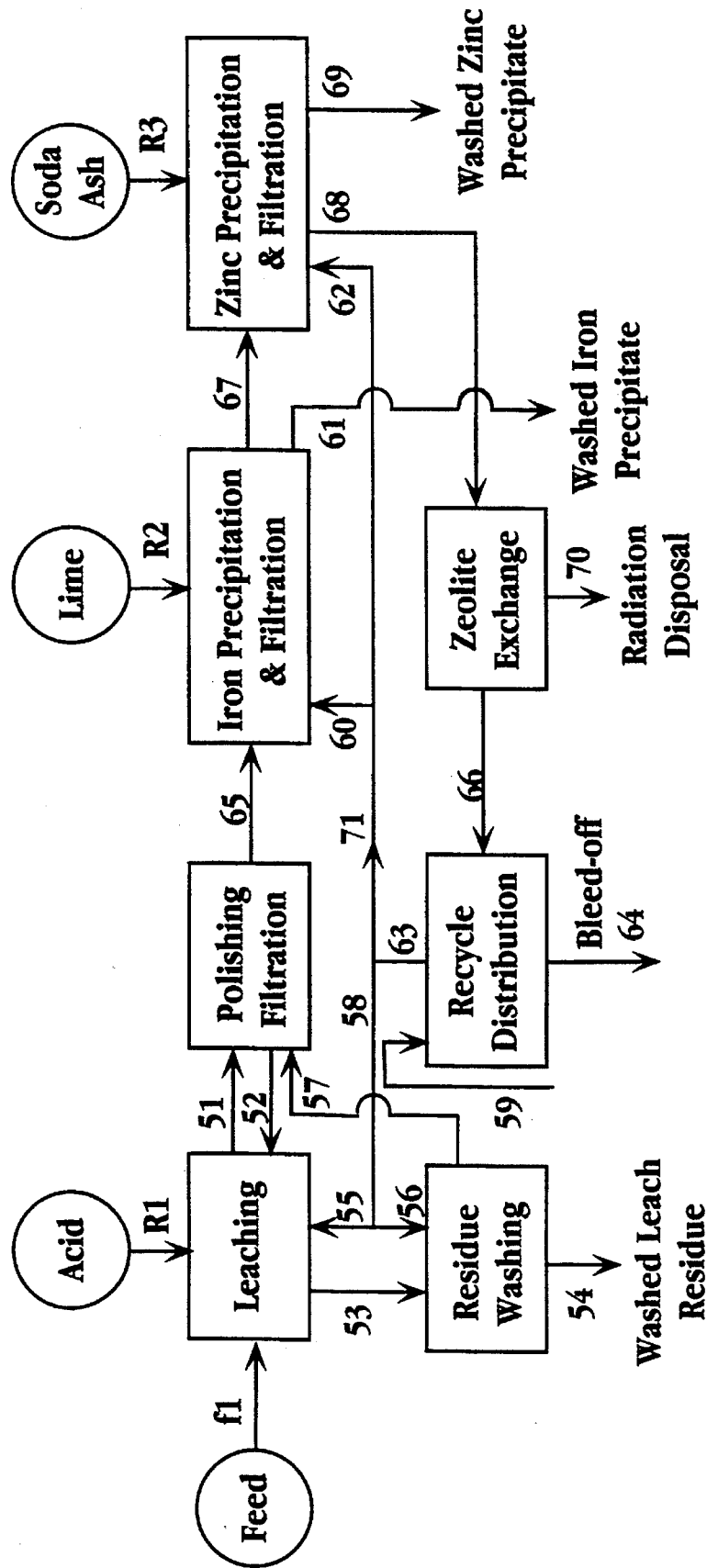
FIG. 3 is a simplified process flow diagram illustrating removal of radioactive cesium from contaminated flue dust and recovery of iron and zinc metals from said dust by selective precipitation methods, in accordance with one general embodiment of the invention.

EAF flue dust contaminated with cesium-137 was treated according to one embodiment of the present invention, as shown in FIGS. 1, 2, 3. Flue dust f1 containing levels of metal contaminants as indicated in Table 3, was fed by means of a feed hopper directly to a primary leaching circuit 11. Flue dust entering the primary leach circuit was slurried with both recycled water 55 and a portion of the acidic leach solution generated in the secondary leach circuit (see below). The terminal acidity level of the first leach circuit was controlled to approximately 20–30 grams per liter free sulfuric acid. The acidity level was maintained by controlling the ratio of the solution recycle from the secondary circuit and the feed rate and chemical content of the fresh flue dust feed.

The temperature of the primary leaching solution was maintained at approximately 70° C.; retention time in the circuit was approximately 60 minutes.

The primary leach slurry was discharged to a liquid-solid separation device 13, such as a centrifuge, vacuum filter, or a settling cylinder, and the solids were allowed to separate. The pregnant solution 51 was further clarified by treatment with two polishing filters and the polished pregnant solution 65 was advanced to a solution surge tank. This step is optional and depends on the solids content of the first leachate fraction. Solids recovered from the filters 52 were returned to the secondary leach circuit for further treatment.

The solids recovered from the primary leach circuit were then fed to a secondary, more stringent, leach circuit 19. The recovered solids were repulped in a solution containing (i) recycled water, (ii) previously generated secondary leach solution, and (iii) concentrated sulfuric acid R1. Sufficient sulfuric acid was added to maintain a terminal acidity of 480 grams per liter of acid. A carrier substance, cesium chloride, was added at an addition rate of 2.5 pounds cesium chloride per ton of feed, to reduce the probability of interfering side reactions and to increase removal efficiencies. The solids were retained in the secondary leach circuit for approximately 3 hours, at 90° C.

The discharge from the secondary leach circuit was fed to a liquid-solid separation device 21. [The recovered highly acidic secondary leachate is stored temporarily and recycled for use in both the primary and secondary leaching circuits.] The recovered solids (leach residue, 53) were washed with recycled 56 and fresh water to reduce the activity of any remaining entrained solution. The washed, leached solids 54 were collected for disposal and analyzed for radioactive and heavy metal content. Cesium levels present in recovered solid and/or liquid fractions were determined by gamma spectroscopy. The solids zinc content was determined by redissolution of the solids, followed by atomic adsorption analysis. The aqueous wash solution was advanced for use in the polishing filtration step. Hydrated lime (calcium hydroxide, R2) was added to the polished pregnant solution to a pH range from approximately 3.8 to 4.2. The addition of base functioned to neutralize excess acid and precipitate the iron contained within the leachate solution 29. The resulting slurry, containing precipitated iron oxides, was fed to a series of liquid-solid separation devices 31 (plate and frame filters) to effect separation of the iron solids from the liquid and to wash the recovered solids free of entrained solution 60. The iron precipitate 61 was recovered and analyzed for all major elemental components contained in the feed material.

The filtrate and recovered wash solutions were combined 67 and treated with a solution of soda ash R3 (sodium carbonate) to effect precipitation of zinc. The pH of the slurry was raised and maintained at about 8.3 for approximately 30 minutes. The resulting slurry was fed to a series of liquid-solid separation devices 35 (plate and frame filters having washing capability) to separate and wash the zinc precipitate. The washed zinc solids 69 were recovered and analyzed for chemical content.

The remaining iron and zinc-free solution 68 was fed to a second surge tank and forwarded to a standard downflow ion-exchange column packed with natural zeolite to effect removal of radioactive cesium. Flow rate was at 16 bed volumes per hour. The loaded ion-exchange medium 70 was analyzed for chemical content and packaged for shipment to a radiation waste disposal site. The activity-free raffinate recovered from the ion exchange column was forwarded for recycle distribution 66.

A summary of the overall mass balance for the process is given in Table 4 and illustrated in FIG. 3. In Table 4, the various process streams are identified in columns 1 and 2, and also indicated in accompanying FIG. 3.

A summary of the overall water balance is shown in Table 5. In addition to fresh water, some water enters the process from indirect sources, as noted in columns 1 and 2. Water is lost during the process at various stages, as shown in columns 3 and 4 of Table 5.

A summary of the overall solids mass balance for the process is given in Table 6. Sources of solids entering the process are given in column 1; sources for solids losses are outlined in column 3.

TABLE 4

| | Stream | Water gpm | TPH | Total Solid TPH | Slurry TPH |
|---|---|---|---|---|---|
| F1 | Feed | | | 3 | 3 |
| R1 | Acid | 2.4 | .6 | 2.62 | 3.22 |
| R2 | Lime | 5 | 1.25 | 1.31 | 2.56 |
| R3 | Soda Ash | 10.2 | 2.55 | .60 | 3.15 |
| 51 | Pregnant Solution | 1.3 | 3.25 | 4.94 | 8.19 |
| 52 | Filter Discharge | 2 | .5 | .06 | .56 |
| 53 | Leach Residue | 3 | .75 | .75 | 1.5 |
| 54 | Wash Leach Residue | 3 | .75 | .75 | 1.5 |
| 55 | Lead Pulp Makeup Water | 11.6 | 2.9 | .01 | 2.91 |
| 56 | Residue Wash | 9 | 2.25 | .01 | 2.26 |
| 57 | Wash Advance | 9 | 2.25 | .01 | 2.26 |
| 58 | 55 + 56 | 20.6 | 5.15 | .02 | 5.17 |
| 59 | Fresh Water | 53.4 | 13.35 | .01 | 13.36 |
| 60 | Iron ppt Wash | 186 | 46.5 | .19 | 46.69 |
| 61 | Iron ppt | 62 | 15.5 | 6.30 | 21.8 |
| 62 | Zn ppt Wash | 18 | 4.5 | .02 | 4.52 |
| 63 | 55 + 56 + 60 + 62 | 224.6 | 56.15 | .23 | 56.38 |
| 64 | Bleed Off | 0 | 0 | 0 | 0 |
| 65 | Polished Pregnant Soln | 20 | 5 | 4.89 | 9.89 |
| 66 | Raffinate | 171.2 | 42.8 | .22 | 43.02 |
| 67 | Zn ppt Feed | 14.9 | 37.25 | .09 | 37.34 |
| 68 | Zeolite IX Feed | 171.2 | 42.8 | .23 | 43.03 |

TABLE 4-continued

| | Stream | Water gpm | TPH | Total Solid TPH | Slurry TPH |
|---|---|---|---|---|---|
| 69 | Zn ppt | 6 | 1.5 | .48 | 1.98 |
| 70 | Rad Disposal | | | | |
| 71 | Iron + Zn ppt Wash 60 + 62 | 204 | 51 | .21 | 51.21 |

TABLE 5

WATER BALANCE, gpm

| In | | Out | |
|---|---|---|---|
| Fresh Water, 59 | 53.4 | Leach Residue, 53 | 3 |
| Acid, R1 | 2.4 | Fe Precipitate, 61 | 62 |
| Lime, R2 | 5.0 | Zn Precipitate, 69 | 6 |
| Soda Ash, R3 | 10.2 | | |
| TOTAL | 71 | TOTAL | 71 |

TABLE 6

TOTAL SOLIDS BALANCE, TPH

| In | | Out | |
|---|---|---|---|
| Dust Feed, F1 | 3 | Leach Residue, 53 | 0.75 |
| Acid, R1 | 2.62 | Rad Disposal, 70 | .01 |
| Lime, R2 | 1.31 | Fe Precipitate, 61 | 6.3 |
| Soda Ash, R3 | 0.60 | Zn Precipitate, 69 | 0.48 |
| Fresh Water, 59 | 0.01 | | |
| TOTAL | 7.54 | TOTAL | 7.54 |

Representative levels of radioactive cesium and zinc contained in the various recovered, treated solid fractions are shown below. The levels shown in Table 7 are typical of the results obtained by the present method. As indicated in Table 7, the process is effective in removing greater than 99% of radioactive cesium contained in contaminated flue dust. The process is also effective for providing recovered iron and zinc solids containing sufficiently low levels of radioactivity to allow such solids to be considered safe and non-hazardous for future disposal and/or sale.

TABLE 7

METAL DISTRIBUTION RECOVERED SOLIDS

Cesium

| Leach Residue, 53 | 0.19% |
|---|---|
| Fe Precipitate, 61 | 0.35% |
| Zn Precipitate, 69 | 0.06% |
| Ion Exchange Resin, 68 | 99.41% |

Zinc

| Leach Residue, 53 | 1.0% |
|---|---|
| Fe Precipitate, 61 | 8.2% |
| Zn Precipitate, 69 | 90.7% |
| Ion Exchange Resin, 68 | 0.1% |

Although the invention has been described with respect to particular embodiment and methods, it will be appreciated how various changes and modifications can be made.

It is claimed:

1. A method for removing radioactive cesium-137 from flue dust composed of a fine-particulate, acid-soluble matrix containing said cesium-137 in bound form, said method comprising the steps of:

(i) forming a slurry of the dust in an acidic aqueous leaching medium that is effective to leach a portion of said cesium-137 from the matrix without solubilizing the matrix;

(ii) treating said slurry under conditions effective to leach at least 50% of said bound cesium from said matrix;

(iii) separating said slurry into a first particulate fraction and a first leachate fraction, (iv) forming a second slurry of said first particulate fraction in a solubilizing acidic aqueous medium capable of solubilizing said matrix;

(v) treating said second slurry under conditions effective to partially solubilize said matrix and reduce the level of said cesium present in particulate form to less than 10% of the originally bound metal, where said treating of the second slurry includes adding a non-radioactive isotope of cesium to the solubilizing acidic medium in an amount sufficient to effectively displace radioactive cesium from the dust matrix;

(vi) separating said second slurry into a second particulate fraction and a second leachate fraction; and (vii) removing said radioactive cesium from the first and second leachate fractions.

2. The method of claim 1, wherein said radioactive cesium is removed from the first and second leachate fractions by ion exchange.

3. The method of claim 1, wherein said flue dust matrix further includes a non-radioactive multivalent metal, and steps (i)–(vi) are also effective to remove said multivalent metal from the matrix, and where prior to said removing step (vii), said multivalent metal is removed from the first and second leachate fractions by precipitation.

4. The method of claim 3, where said multivalent metal is iron or zinc.

5. The method of claim 1, wherein the acidic aqueous leaching medium contains between 0.2 and 0.5 molar sulfuric acid.

6. The method of claim 1, wherein the acidic aqueous solubilizing medium contains between 3 and 5 molar sulfuric acid.

7. The method of claim 1, wherein step (vi) further includes recycling the second leachate fraction to both said acidic aqueous leaching medium from step (i) and to said solubilizing acidic aqueous medium from step (iv).

8. A method for removing radioactive cesium-137 metal from flue dust also containing iron and zinc metal, said flue composed of a fine-particulate, acid-soluble matrix containing said metals in bound form, said method comprising the steps of:

(i) forming a slurry of the dust in an acidic aqueous leaching medium that is effective to leach a portion of said metals from the matrix without solubilizing the matrix;

(ii) treating said slurry under conditions effective to leach at least 50% of said bound metals from the matrix;

(iii) separating said slurry into a first particulate fraction and a first leachate fraction;

(iv) forming a second slurry of said first particulate fraction in a solubilizing acidic aqueous medium containing non-radioactive cesium, said solubilizing medium being effective to partially solubilize said matrix;

(v) treating said second slurry under conditions effective to partially solubilize said matrix, to reduce the level of cesium-137 present in particulate form to less than 10% of the originally bound metal;

(vi) separating said second slurry into a second particulate fraction and a second leachate fraction;

(vii) raising the pH of said leachate fractions to between about 3 and 5 to effect precipitation of iron therefrom to form an iron-free leachate;

(viii) adjusting the pH of the iron-free leachate to at least about 8 to effect precipitation of zinc therefrom and form an iron and zinc-free solution; and (ix) removing the remaining radioactive cesium contained in the iron and zinc-free solution by ion exchange.

9. The method of claim 8, where said removing step includes ion exchange using a natural zeolite ion exchange medium.

* * * * *